United States Patent [19]
Schad et al.

[11] Patent Number: 4,593,853
[45] Date of Patent: Jun. 10, 1986

[54] PLASTIC PIPE HAVING AN OXYGEN-IMPERMEABLE CASING

[75] Inventors: Alfred Schad, Wiesbaden; Klaus Heyse, Bad Soden, both of Fed. Rep. of Germany

[73] Assignee: Hoechst Aktiengesellschaft, Frankfurt am Main, Fed. Rep. of Germany

[21] Appl. No.: 540,114

[22] Filed: Oct. 11, 1983

Related U.S. Application Data

[63] Continuation of Ser. No. 329,671, Dec. 11, 1981, abandoned.

[30] Foreign Application Priority Data

Dec. 15, 1980 [DE] Fed. Rep. of Germany ....... 3047181

[51] Int. Cl.⁴ ............................................. F16L 9/12
[52] U.S. Cl. ...................................... 237/56; 138/141; 138/144
[58] Field of Search ................. 138/118.1, 137, 138, 138/141–144, 146, 150, 151, DIG. 6; 237/69, 56; 428/423.7; 215/1 C

[56] References Cited

U.S. PATENT DOCUMENTS

| | | | |
|---|---|---|---|
| 2,081,538 | 5/1937 | Hoarle | 138/141 X |
| 2,489,130 | 11/1949 | Harter | 237/69 X |
| 2,963,045 | 12/1960 | Canevari et al. | 138/146 |
| 3,400,029 | 9/1968 | Mesrobian et al. | 138/144 X |
| 3,561,493 | 2/1971 | Maillard et al. | 138/141 |
| 3,589,402 | 6/1971 | Buck | 138/137 |
| 3,741,253 | 6/1973 | Brax et al. | 138/137 |
| 4,044,187 | 8/1977 | Kremkau | 138/141 X |
| 4,123,589 | 10/1978 | Korlatzki et al. | 138/118.1 X |
| 4,178,401 | 12/1979 | Weinberg et al. | 138/137 X |
| 4,243,074 | 1/1981 | Strutzel et al. | 138/118.1 |
| 4,296,156 | 10/1981 | Lustig et al. | 138/118.1 X |

FOREIGN PATENT DOCUMENTS

| | | | |
|---|---|---|---|
| 0026421 | 4/1981 | European Pat. Off. | 138/143 |
| 30091 | 10/1981 | European Pat. Off. | |
| 1175005 | 12/1969 | United Kingdom . | |

Primary Examiner—Stephen Marcus
Assistant Examiner—Mark Thronson
Attorney, Agent, or Firm—Schwartz, Jeffery, Schwaab, Mack, Blumenthal & Evans

[57] ABSTRACT

A plastic pipe comprising an oxygen-impermeable casing, wherein the casing comprises a barrier layer for oxygen, and an adhesive layer adjacent to the circumferential surface of the pipe and attached to the circumferential surface by an sealed bond, wherein the casing surrounds the circumferential surface on all sides, and wherein the barrier layer is elastic, is substantially impermeable to oxygen and comprises a polyvinyl alcohol, a vinyl alcohol/ethylene copolymer, or polyacrylonitrile. Also disclosed is a process for the production of the pipe and a use of the pipe as a heating pipe.

14 Claims, 5 Drawing Figures

PLASTIC PIPE HAVING AN OXYGEN-IMPERMEABLE CASING

This application is a continuation of application Ser. No. 329,671, filed Dec. 11, 1981, now abandoned.

BACKGROUND OF THE INVENTION

The present invention relates to a plastic pipe having a multi-layer casing which includes an elastic barrier layer which is virtually impermeable to oxygen and to a process for the production of the pipe.

The plastic pipe, encased in accordance with the invention, is used particularly in the heating industry for underfloor hot water heating systems.

In addition to steel or copper pipes, plastic pipes, in particular pipes made of polyolefins, have, in recent years, become important in the construction of heating systems.

However, plastic pipes have the disadvantage that their walls have an undesirably high permeability to oxygen, even at room temperature. A pipe composed, for example, of high density polyethylene and having a wall thickness of, for example, 2 mm and an external diameter of 20 mm, has a permeability to oxygen of approximately 3 $cm^3$/m of pipe length per day and per bar at 23° C.

Oxygen, therefore, enters continuously into the heating circulation via the hot water circulating as heat transfer agent in the pipes of the heating system. The oxygen thus comes into contact with iron components of the heating system, for example, the boiler or the radiators. The iron components present in the heating circuit are, therefore, subject to corrosion, and there is a risk that they may become unserviceable after some years of use as a result of this corrosion.

In order to eliminate this disadvantage of plastic pipes, it has been suggested that the plastic pipes used in heating systems should be surrounded with a casing composed of a film laminate comprising a layer of stretch-oriented polyester film as a supporting material, an aluminum foil as a barrier layer impermeable to oxygen and a layer of hot-melt adhesive.

The polyester film forms the outer side of the casing. The aluminum foil layer is adjacent to the surface of the pipe and is joined to the latter by an adhesive bond.

However, the proposed casing sheath has the disadvantage that its aluminum layer is no longer adequately impermeable to oxygen after it has been subjected to stretching when the pipe is bent and also as a result of thermal expansion of the pipe, since these factors cause it to crack. The thermal expansion of the pipe has the effect that the coefficient of thermal expansion of the plastic forming the pipe is considerably greater than the coefficient of the thermal expansion of the aluminum barrier layer which is attached to the pipe.

In some cases, the encased pipes are bent in order to convert them into a curved state. The casing surrounding the pipe is subjected to considerable strain through bending the pipe, particularly if the bent pipe elbow has a small radius.

After the encased pipes have been installed, the barrier layer of the casing is subjected to strain because the diameter of the pipe increases when the pipe is carrying hot water.

In a section of the aluminum foil barrier layer which is subjected to strain, this layer is no longer impermeable to oxygen.

SUMMARY OF THE INVENTION

Therefore, an object of the present invention is to provide a plastic pipe having a casing which includes an elastic barrier layer which is substantially impermeable to oxygen.

Another object of the present invention is the provision of a plastic pipe having an outer protective layer to protect the casing from mechanical and chemical action.

Still another object of the present invention is the provision of a plastic pipe exhibiting improved expansion and stress cooperation between the layers of the casing.

A further object of the present invention is the provision of processes for the production of plastic pipes comprising a casing which is substantially impermeable to oxygen.

Yet another object of the present invention is the provision of a plastic pipe for use as a heating pipe.

In accomplishing the foregoing objects of the present invention, there has been provided in accordance with one aspect of the present invention a plastic pipe comprising an oxygen-impermeable casing, wherein the casing comprises a barrier layer for oxygen and a sealable layer adjacent to the circumferential surface of the pipe and attached to the circumferential surface by a sealed bond, wherein the casing surrounds the circumferential surface on all sides, and wherein the barrier layer is elastic, is substantially impermeable to oxygen and comprises a polyvinyl alcohol, a vinyl alcohol-/ethylene copolymer, or polyacryacrylonitrile.

In a preferred embodiment of the present invention, the plastic pipe further comprises a protective layer comprising a tough and elastic thermoplastic, wherein the protective layer comprises the outer face of the casing.

In accordance with another aspect of the present invention, there are provided processes for the production of plastic pipes comprising an oxygen-impermeable casing, comprising the steps of providing a plastic pipe, covering the entire length of the circumferential surface of the pipe with a casing comprising a polyolefin layer, a polyvinyl alcohol or a vinyl alcohol/ethylene copolymer, or polyacrylonitrile barrier layer adjacent to the polyolefin layer and a sealable layer adjacent to the barrier layer and to the circumferential surface of the pipe, subjecting the casing to heat to provide a sealed bond, and cooling the casing to set the sealed bond.

In accordance with yet another aspect of the present invention, there is provided a plastic pipe comprising an oxygen-impermeable casing, wherein the pipe is used as a heating pipe.

Further objects, features and advantages of the present invention will become apparent from the detailed description of preferred embodiments which follows, when considered in light of the attached figures of the drawing.

DETAILED DESCRIPTION OF PREFERRED EMBODIMENTS

Figure 1:
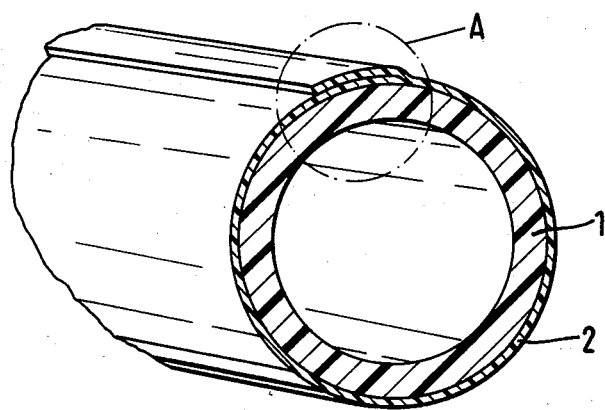
FIG. 1 is a cross section and a diagrammatic perspective representation of a pipe according to the first embodiment of the invention.

The present invention provides a plastic pipe of improved impermeability to oxygen by providing the pipe with an elastic casing barrier layer. A casing barrier layer which is elastic and virtually impermeable to oxygen is to be understood, in accordance with the definition, as a barrier layer which is composed of plastic and is extensible by at least 40%, advantageously by more than 100%, at room temperature and is virtually impermeable to oxygen, even in the extended state.

The barrier layer has a thickness of at least 5 $\mu$m; preferably it has a thickness within the range from about 12 to 25 $\mu$m.

The barrier layer has an oxygen permeation value of not more than 5 $cm^3/m^2$ per day per bar at 23° C. and a relative atmospheric humidity of 25%. An encased pipe which has a diameter of 20 mm and a barrier layer characterized by the oxygen permeation value indicated, has a permeability to oxygen of at most 0.3 $cm^3/m$ of tube length per day per bar.

The barrier layer is composed of a synthetic thermoplastic, selected from a group comprising polyvinyl alcohol and also vinyl alcohol/ethylene copoloymers containing, in quantitive terms, a low proportion of copolymerized ethylene. The proportion of copolymerized ethylene in the copolymer is advantageously not more than about 40 mole %, and particularly, preferentially not more than about 20 mole %, relative to the total weight of the copolymer.

Vinyl alcohol/ethylene copolymers are to be understood, in accordance with the definition, as copolymers formed by copolymerizing ethylene with vinyl acetate and subsequently saponifying the copolymerized vinyl acetate virtually completely, so that at least about 97% by weight of the acetyl groups in the copolymer have been converted into OH groups by saponification.

A barrier layer composed of polyvinyl alcohol is to be understood as a polymer formed by polymerizing vinyl acetate and subsequently saponifying the latter virtually completely, so that at least 97% by weight of the acetate groups have been converted into OH groups by saponification.

The barrier layer may also be composed of polyacrylonitrile.

The barrier layer is advantageously composed of plastic film, in particular, a plastic film which has been oriented by biaxial stretching and has the properties described above.

The second casing layer, which is immediately adjacent to the circumferential surface of the pipe, is composed of a synthetic polymer which can be converted by the action of heat into a sealable condition, for example of a polyolefin, preferably of polyethylene.

Having been cooled down again, the sealable material is able to form a firm, sealed composite. The thickness of the sealable casing layer which is immediately adjacent to the circumferential surface of the pipe preferably is 20 to 50 $\mu$m.

The second casing layer is firmly attached by sealing to the circumferential surface of the pipe.

The encased pipe can advantageously be constructed in such a way that a layer composed of a tough, elastic thermoplastic is located on the outer side of the barrier layer of the casing and acts as a protective layer against mechanical and/or chemical action. This layer can, for example, be composed of polyolefin, preferably of polyethylene and can have, for example, a thickness of about 50 $\mu$m.

In the casing design indicated, there is located between the protective layer and the barrier layer of the casing, a thin layer of a chemical material which is capable, because of its chemical structure, of producing a firm sealed joint between the protective layer and the barrier layer, for example, a layer composed of a two-component adhesive based on polyurethanes. The adhesion-promoting layer has a thickness which is negligibly small in comparison with the thickness of the barrier layer or of the protective layer.

The shape and the cross-sectional dimension of the casing enclosing the pipe correspond to the shape and dimension of the pipe; the inner side of the casing is immediately adjacent to the outer side of the pipe.

The encased pipe can also be designed in such a way that a metallic layer has been deposited by vaporization on the inside of the transparent protective layer of the casing.

In accordance with a first embodiment of the present invention, the casing surrounding the pipe comprises a hollow cylindrical body which has been formed from a rectangularly shaped film laminate blank. The hollow cylindrical body is slit along its longitudinal axis and has overlapping zones of the cut edges which run parallel to one another. The film laminate blank forming the hollow body or, respectively, the wall of the hollow body formed by it, is, for example, constructed in three layers. It comprises a polyvinyl alcohol, a vinyl alcohol/ethylene copolymer, or polyacrylonitrile film which has preferably been oriented by biaxial stretching, one surface of which is adjacent to, and is firmly attached to a protective layer composed of polyolefin, preferably polyethylene, while a layer of a sealable material of the type indicated, is adjacent to, and is firmly attached to, the other surface of the film described.

The hollow cylindrical element which has been constructed as indicated above can be shaped around the pipe to give the casing described above by bending the rectangularly shaped film laminate blank which has been constructed as indicated, whereby its longitudinal axis is used as the line of bending.

The casing of this spatial construction, composed of the film laminate, surrounds the circumferential surface of the pipe in a manner such that the sealable laminate layer is immediately adjacent to this surface, and the polyolefin, preferably polyethylene layer of the casing forms an outer face. The casing and the circumferential surface of the pipe are attached to one another in the interfacial zone by sealing. The casing and the circumferential surface of the pipe may be attached to one another either in the whole interfacial zone or at predetermined distances.

In the overlapping zone of the casing, the parts of the casing are attached to one another by sealing in the interfacial zone between the sealable layer and the protective layer.

The starting material used for the production of a pipe of specific length, which is encased as indicated, is a rectangular film laminate blank of the above-described structure, the length of which matches the length of the pipe to be encased and the breadth of which is greater than the circumference of the pipe. The blank is then bent about its longitudinal axis as the line of bending, around the pipe to be encased, in such a way that a cylindrical hollow body which has a straight slit along its longitudinal axis and has an overlapping zone of its side edges which run parallel to one another is formed from the blank. The hollow cylindrical body is arranged around the pipe so that the sealable layer of the film laminate blank forming this hollow cylindrical body faces the circumferential surface of the pipe and is immediately adjacent to the latter. The protective layer of the blank forming the hollow cylindrical body forms the outer face of the casing.

The casing is then subjected to heat at a temperature of, for example, about 150° C., which is sufficient to activate the sealable casing layer so that it produces a sealable bond between the casing and the pipe. The casing is then pressed onto the circumference of the pipe under a slight applied pressure and is then cooled to room temperature. When the casing has cooled there is a firm sealed joint between it and the pipe.

When using the laminated film, described in the aforementioned embodiment, the overlapping zone of the casing has the following structure, viewed from the outside to the inside: polyolefin, preferably polyethylene layer / polyvinyl alcohol layer / sealable layer / polyolefin, preferably polyethylene layer / polyvinyl alcohol layer / sealable layer; the latter layer is adjacent to the circumferential surface of the pipe.

In the overlapping zone of the casing, the sealed joint is effected at the interface between the polyolefin layer of one overlapping section and the sealable layer, which is adjacent to this layer, of the other overlapping section.

In a second embodiment of the present invention, the encased pipe can be constructed in such a way that the casing is composed of a spirally overlapping wound strip of film, which fits the circumference of the pipe under the tension of winding. The structure of the film strip is the same as, for example, the structure of the three-layer film laminate used for the construction of the first variant of the invention.

The film strip is wound spirally around the whole circumference of the pipe, over the whole length of the latter, in such a way that the sealable layer of the film strip is adjacent to the circumferential surface of the pipe.

The wound casing, which is pressed onto the surface of the pipe by the tension of winding, is the subjected to heat and, advantageously, additionally, to pressure, and is then cooled to room temperature.

In a third embodiment of the present invention, the barrier layer is constructed in a seamless manner and is composed, for example, of extrudable polyvinyl alcohol. The third embodiment of the invention can be produced by first applying to the circumferential surface of the pipe to be encased an adhesion promoter which is, for example, based on an ethylene copolymer containing a predominant proportion of copolymerized ethylene and by then applying a barrier layer which, for example, is composed of polyvinyl alcohol, to the plastic pipe which has been pretreated as indicated above. The pipe is encased in a known manner by the extrusion process, with the aid of known devices, whereby a seamless coating of polyvinyl alcohol is produced on the pipe.

If appropriate, a thin layer of an adhesion-promoting chemical substance, for example, of an ethylene copolymer containing a predominant proportion of copolymerized ethylene, is applied to the outer face of the seamless coating of polyvinyl alcohol, and a seamless protective layer, composed, for example, of polyolefin, preferably polyethylene, is then formed on the coated surface of the seamless polyvinyl alcohol coating. The seamless protective layer can be applied, for example, by means of known extrusion processes. Devices suitable for this purpose are known. It is also possible to apply all mentioned layers simultaneously, by means of a coextrusion process. Suitable coextrusion devices are known.

The invention is now explained in more detail by reference to FIGS. 1 and 2, and to the Comparative Example which follows.

FIG. 1 illustrates the plastic pipe 1 and the pipe casing, generally noted as 2. The structural design of the casing is not shown in FIG. 1 for reasons of simplicity in the drawing, but is shown in FIG. 2, which provides an enlarged view of the section A from FIG. 1.

Figure 2:
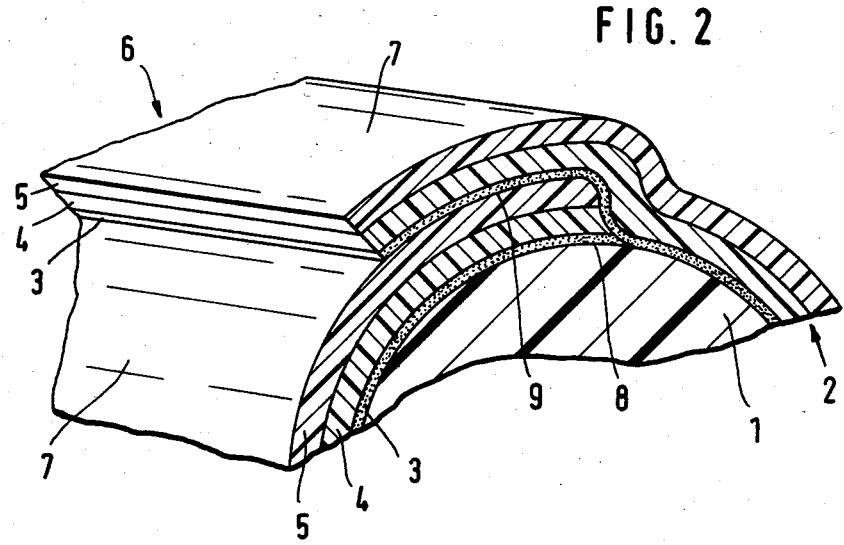
FIG. 2 is a diagrammatic, semi-perspective and enlarged representation of section A from FIG. 1. The elements of the encased pipe shown in FIG. 2 are not drawn to scale.

In FIG. 2, the numbers 1 and 2 have the same meaning as in FIG. 1. The number 3 designates the sealable layer of the pipe casing. The barrier layer of the casing is numbered 4 and the protective layer 5. 6 means the overlapping section of the casing, and 7 means the outer surface of the casing. The interface 8 between the casing 2 and the pipe 1 is that region in which the casing and the pipe are attached to one another by sealing. 9 is the interface region (overlapping zone) in the overlapping section 6 of the casing. In the interface region 9 of the overlapping section the overlapping casing sections are attached to one another by sealing.

Figure 3:
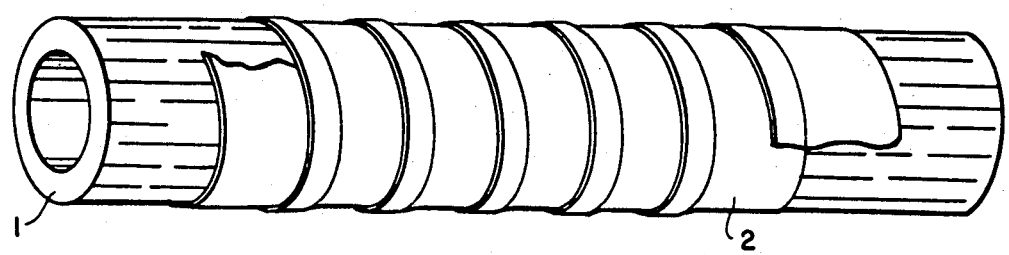
FIG. 3 is a schematic view of a pipe showing a spirally wound casing.

FIG. 3 illustrates the embodiment of the present invention in which the casing is spirally wound about the plastic pipe.

Figure 4:
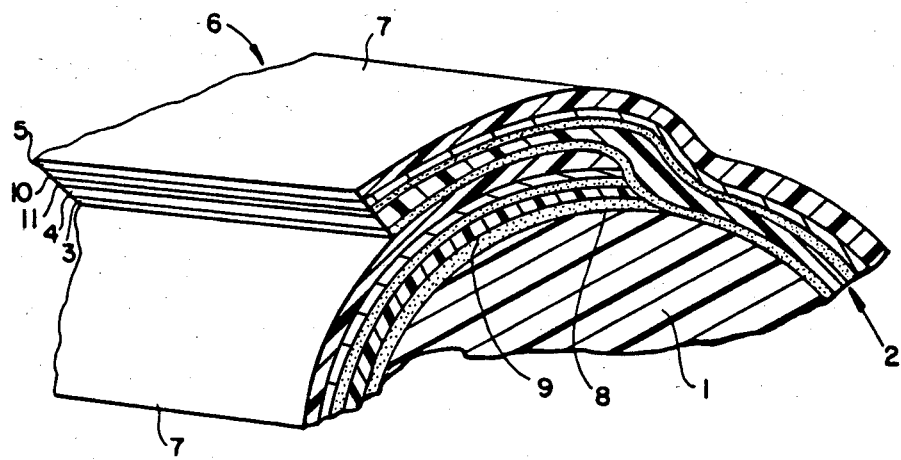
FIG. 4 is a diagrammatic, semi-perspective and enlarged representation of Section A from FIG. 1, similar to FIG. 2, but illustrating a further embodiment of the present invention.

FIG. 4 reflects the embodiment of the present invention in which, in addition to the layers illustrated in FIG. 2 and described above, the casing is shown as including an aluminum layer 10 and an adhesive layer 11.

Figure 5:
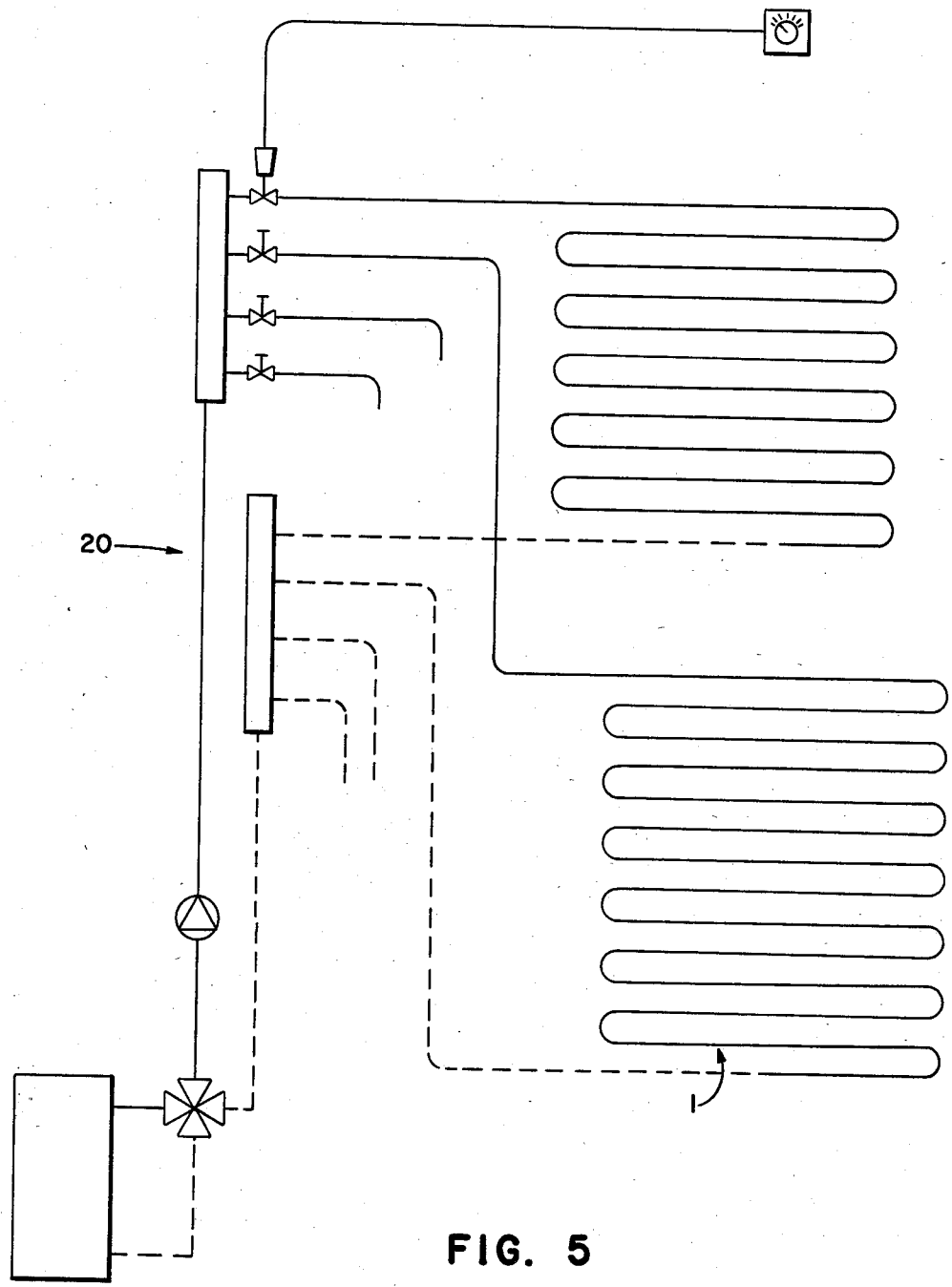
FIG. 5 is a partial schematic representation of a heating system which includes the plastic pipe of the present invention.

The oxygen-impermeable plastic pipe of the present invention, as noted, finds particular applicability in underfloor hot water heating systems. FIG. 5 is a schematic representation of such a heating system 20 which includes the oxygen-impermeable plastic pipe 1 of the present invention.

COMPARATIVE EXAMPLE

A plastic pipe composed of crosslinked polyethylene and having an external diameter of 20 mm and a wall thickness of 2 mm has a permeability to oxygen of 7.5 $cm^3/m$ of pipe length per day per bar at 50° C.

When it is surrounded in accordance with the invention by a casing, comprising a polyvinyl alcohol barrier layer of a thickness of 12 $\mu m$, a plastic pipe of this type has a permeability to oxygen of 0.003 $cm^3/m$ of pipe length per day per bar.

In the last-mentioned base, permeability to oxygen is to be understood as meaning that quantity of oxygen which is capable, under the conditions mentioned, of penetrating through the casing and the pipe wall into the hollow interior space of the pipe.

The measurements were carried out in each case at a relative humidity of 25% and under otherwise comparable experimental conditions.

The pipes according to this invention, which are enclosed by a seamless casing, can also be manufactured by simultaneously forming the pipe and the casing by means of a coextrusion process.

We claim:

1. An oxygen-impermeable plastic pipe, comprising:
a self-supporting plastic pipe; and
a pre-formed film laminate casing wrapped about said pipe comprising,
   (a) a heat sealable layer adjacent to the circumferential surface of said pipe and attached to said circumferential surface by a heat sealed bond, and
   (b) a substantially oxygen-impermeable, biaxially stretch-oriented, elastic barrier layer adjacent to said sealable layer comprising polyvinyl alcohol or a vinyl alcohol/ethylene copolymer.

2. A plastic pipe as defined in claim 1, further comprising a protective layer comprising a tough, elastic thermoplastic, wherein said protective layer comprises the outer face of said casing.

3. A plastic pipe as defined in claim 1, wherein said casing comprises a hollow cylindrical element slit along the longitudinal axis of said cylindrical element to form cut-edges and comprising overlapping zones of the cut edges, wherein said cylindrical element is formed from a film laminate blank, and wherein said laminate blank formed into said cylindrical element comprises an outer protective polymer layer, said barrier layer and said heat sealable layer adjacent to and attached to said circumferential surface by said heat sealed bond.

4. A plastic pipe as defined in claim 1 wherein said casing comprises a film band wound spirally, in an overlapping manner, over the entire length of said circumferential surface, wherein said film band comprises a laminate, comprising an outer protective polymer layer as the outer face of said band, said protective layer forming the outer face of said casing, said barrier layer adjacent to said protective layer, and said heat sealable layer adjacent to said barrier layer and to the circumferential surface of said pipe.

5. A plastic pipe as defined in claim 1, wherein said barrier layer comprises not more than about 40 mole % ethylene in said vinyl alcohol/ethylene copolymer.

6. A plastic pipe as defined in claim 5, wherein said ethylene is present in an amount not greater than about 20 mole %.

7. A plastic pipe as defined in claim 1, wherein said barrier layer is extensible by at least about 40% at room temperature.

8. A plastic pipe as defined in claim 7, wherein said barrier layer is extensible by at least about 100% at room temperature.

9. A plastic pipe as defined in claim 2, further comprising an adhesive layer between said protective layer and said barrier layer.

10. A plastic pipe as defined in claim 9, wherein said adhesive layer comprises a two-component adhesive comprising a polyurethane.

11. A plastic pipe as defined in claim 10, wherein the thickness of said adhesive layer is negligibly small compared to the thickness of said barrier layer and said protective layer.

12. A plastic pipe as defined in claim 2, further comprising providing a metallic layer vaporization deposited on the inner surface of said protective layer.

13. A plastic pipe as defined in claim 2, wherein said protective layer is transparent.

14. A heating system, comprising at least one iron component and at least one plastic pipe connected to said iron component for circulating a heat transfer agent thereto, wherein said plastic pipe comprises an oxygen-impermeable plastic pipe as claimed in claim 1.

* * * * *